United States Patent [19]

Studer et al.

[11] 4,077,678
[45] Mar. 7, 1978

[54] ENERGY STORAGE APPARATUS

[75] Inventors: Philip A. Studer, Silver Spring; Harold E. Evans, Beltsville, both of Md.

[73] Assignee: The United States of America as represented by the Administrator of the National Aeronautics and Space Administration, Washington, D.C.

[21] Appl. No.: 710,035

[22] Filed: Jul. 30, 1976

[51] Int. Cl.² .............................................. F16C 39/00
[52] U.S. Cl. ...................................... 308/10; 310/153; 310/269; 310/154; 310/178
[58] Field of Search ................ 310/178, 153, 74, 154, 310/67, 269; 308/10; 322/4, 48, 49

[56] References Cited

U.S. PATENT DOCUMENTS

| 3,158,750 | 11/1964 | Roes | 322/4 |
| 3,569,804 | 3/1971 | Studer | 310/254 |
| 3,845,995 | 11/1974 | Wehde | 308/10 |
| 3,888,553 | 6/1975 | Wehde | 308/10 |

FOREIGN PATENT DOCUMENTS

| 2,360,412 | 6/1975 | Germany | 308/10 |

Primary Examiner—R. Skudy
Attorney, Agent, or Firm—Robert D. Marchant; John R. Manning; John O. Tresansky

[57] ABSTRACT

An energy storage device comprises a flywheel rotor in the form of a spokeless ring of filamentary, composite material rotating around a ring-shaped stator. Along the inner rim of the rotor, there is a layer of magnetically soft iron that forms homopolar, salient pole pairs. An ironless armature winding mounted on the stator extends into an air gap formed between the pole pairs. To bring the rotor up to speed, alternating current is supplied to the armature winding using electronic commutation. The armature current interacts with flux in the air gap to create a force acting to rotate the rotor. During coast down, current may be tapped from the rotor using commutation diodes. The rotor and stator are maintained in axial alignment to each other by magnetic flux produced by a permanent magnet in the stator. An electromagnet incorporated in the stator modulates permanent magnet flux to compensate for any eccentricity between the stator and the rotor that may develop during rotation.

14 Claims, 5 Drawing Figures

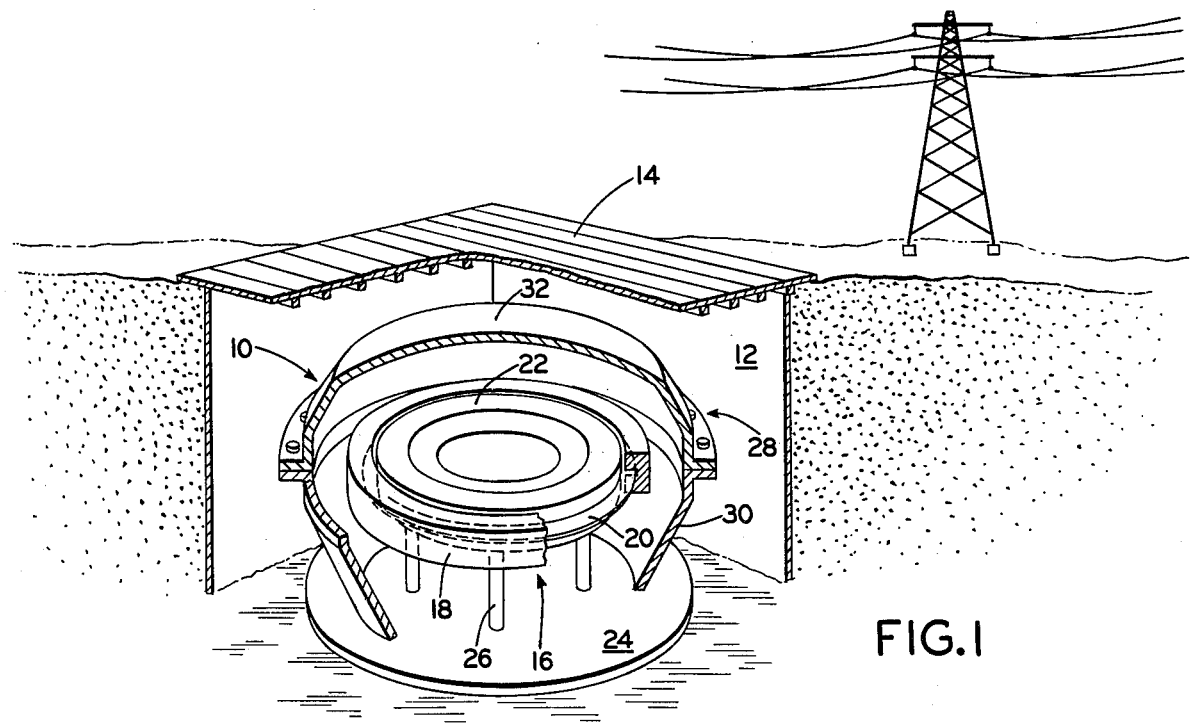
FIG.1
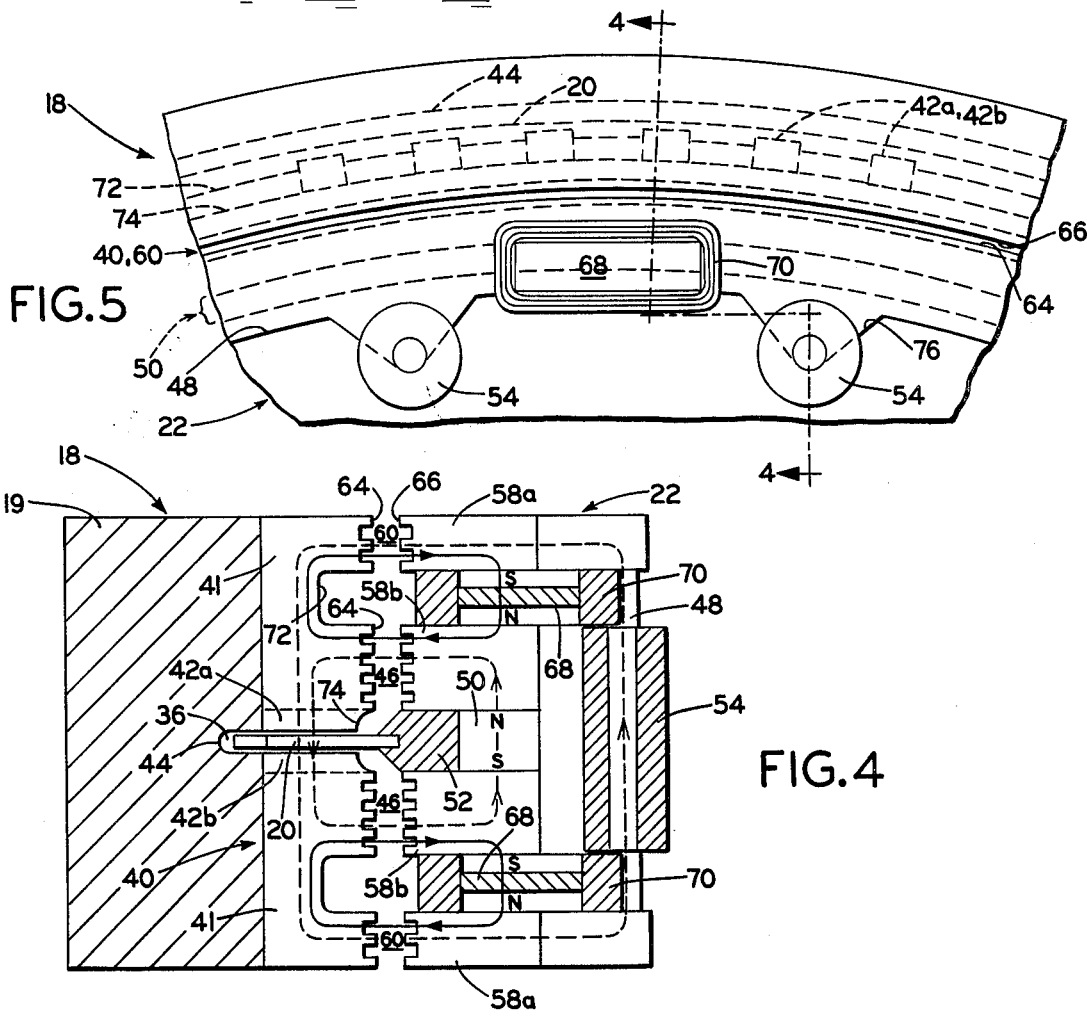
FIG.5
FIG.4

ENERGY STORAGE APPARATUS

ORIGIN OF THE INVENTION

The invention described herein was made by employees of the United States Government and it may be manufactured and used by and for the United States Government for Governmental purposes without the payment of any royalties thereon or therefore.

FIELD OF THE INVENTION

This invention relates generally to mechanical energy storage devices, and more particularly to a highly efficient mechanical storage device comprising a magnetically levitated, spokeless, flywheel rotor having homopolar salient poles and a stationary, ironless, electronically commutated armature.

BACKGROUND OF THE INVENTION

A basic problem presently facing utility companies is variation in demand for power. Electric utilities typically incorporate (1) base load generators, (2) intermediate load generators, and (3) peak load generators to accomodate daily load demands. Base load generators, which operate 100% of the time at constant throttle, are powered by relatively less expensive fossil fuel or by nuclear generators. About 70% of the system power output is generated by the base load generators operating at lowest delivered cost. The intermediate load generators, which are typically gas turbines or diesel engines, are powered by less efficient fossil-fueled steam generators and gas turbines. The intermediate load generators are normally run only during the day, and furnish about 25% of the power at significantly higher costs. The remaining power is derived from peak load generators requiring costly and scarce fuels. Peak load generators are operated only on demand and serve the immediate load peaks of the day.

In the past, electric utilities have attempted to reduce the high cost of peak power generation through pumped hydroelectric storage. Typically, water is pumped uphill during off-peak hours and stored in a reservoir for later peak hour use. This method is practical only for large scale use and is limited to locations where geography permits construction of large reservoirs. In another approach, air is compressed during off-peak hours, and the potential energy stored in the compressed air is later released for use during peak hours. This has also been shown to be of limited practicality.

It has been proposed to store energy during low demand periods by using electric power to rotate a massive flywheel, and tapping energy from the flywheel during high demand periods. A flywheel rotor in conjunction with an electric motor/generator unit is provided, wherein by operating the unit as a motor, the flywheel rotor is brought up to operating speed and allowed to coast. Energy is extracted from the flywheel rotor during coasting by operating the motor/generator unit as a generator.

Rotating flywheel systems have not been entirely successful due to low operating efficiency caused by, among other factors, losses from eddy currents, friction, windage and relatively poor energy storage per unit weight of the flywheel. In addition, there is a substantial hazard of catastrophic failure of the rotor.

In U.S. Pat. No. 3,158,750 to Roes, a mechanical energy storage device includes a rotor rotatably supported on a frame. A series of magnets are spaced apart from each other along the outer rim of the rotor. A synchronous armature winding mounted on the frame is disposed so as to intersect the magnetic field established by the rotor magnets and to cause torque to be applied to the rotor when alternating current is passed through the armature winding. The rotor is supported by spokes extending to a shaft that in turn is journaled to a set of conventional magnetic bearings.

Although generally somewhat satisfactory for limited use in an outer space environment, the efficiency of the Roes system is insufficient for storage of energy of the magnitudes required by electric utilities. The magnets contained on the rotor in Roes create magnetic fields that tend to induce eddy currents in the stationary, metallic frame members in proximity to the rotor. These eddy currents result in eddy current losses that substantially diminish storage efficiency. The magnets along the rim of the rotor, being discrete elements, also create balancing problems and induce additional stresses on the rotor thereby increasing the chances of failure. The magnets themselves are difficult to manufacture because they must be accurately ground to size and imbedded into the rotor so as to create minimum imbalance and stress concentrations.

Accordingly, an object of the present invention is to provide a new and improved mechanical energy storage device.

Another object of the present invention is to provide a new and improved energy storage system incorporating a flywheel rotor.

Another object of the present invention is to provide a flywheel energy storage device that is highly efficient and less prone to structural failure.

Yet another object of the present invention is to provide a motor-driven, flywheel-type energy storage device including a continuous, spokeless, flywheel rotor having no discrete rotor elements.

Still another object of the present invention is to provide a motor-driven, flywheel-type energy storage device, wherein eddy current losses are minimized.

Still another object of the present invention is to provide a motor-driven, flywheel-type energy storage device, wherein a flywheel rotor is devoid of permanent magnets so as to reduce eddy current losses by interaction of a moving magnetic field with stationary elements.

Yet another object of the present invention is to provide a motor-driven, flywheel-type energy storage device, including a flywheel rotor having high specific strength per unit weight density.

Still another object of the present invention is to provide a new and improved motor-driven, flywheel-type energy storage device, wherein a flywheel rotor is magnetically levitated to eliminate mechanical drag between the rotor and stationary elements.

SUMMARY OF THE INVENTION

In accordance with the present invention, a high efficiency, flywheel-type energy storage device comprises an electronically commutated D.C. motor/generator unit having a massive flywheel rotor magnetically suspended around a ring-shaped stator. During periods of low energy demand, the storage device is operated as a motor, and the flywheel rotor is brought up to operating speed. Energy is drawn from the device functioning as a generator as the massive flywheel rotor rotates during high energy demand periods.

For high specific strength to weight density ratio, the flywheel rotor comprises a spokeless ring made of filamentary, composite (anisotropic) material. The inner rim of the rotor contains a layer of magnetically soft iron. The iron is shaped to present a series of North-South pole pairs to the air gap between the stator and rotor. The North and South poles of each pole pair are separated from each other by a circumferential slot in the iron layer.

An ironless armature, mounted to the stator, extends into the circumferential slot between the poles on the rotor. A permanent magnet in the stator produces a magnetic flux in the air gap between the rotor and stator, and through the circumferential slot between the poles. With the storage device operating as a motor, alternating current is supplied to the armature by electronic (brushless) commutation. Interaction between the alternating current in the armature and flux in the circumferential slot produces a force acting to rotate the rotor. Commutation is provided to the armature using known electronic commutation circuitry. When the device is used as a generator, commutation diodes are connected to the proper phases of the armature coil; there is no requirement for forced commutation as in motor operation. The magnitude of the flux passing through the armature is controlled by a field coil located in the stator in shunt with the permanent magnet. The permanent magnet (field magnet) may be a ring-shaped, Samarium Cobalt magnet extending along the interior of the ring stator.

The flywheel rotor is homopolar to the extent that there is no flux reversal between the pole pairs. Current return in the armature occurs in regions of low flux density between pole pairs, rather than in regions of flux reversal at alternate poles. Because the poles are formed of magnetically soft iron, rather than of permanent magnets as in the prior art, there are reduced eddy current losses caused by interaction between moving magnets and stationary metallic members.

In order to suspend the flywheel rotor without contact with respect to the stator, permanent magnets are incorporated in the stator for establishing a steady state magnetic flux through the air gap between the rotor and stator. Sets of teeth on the rims of the rotor and stator in facing relationship to each other in the air gap tend to maintain the rotor and stator in axial alignment to each other as the rotor orients itself to provide a path of least magnetic reluctance for the steady state magnetic flux. This is termed "passive" suspension. "Active" suspension in the radial direction is provided by a set of electromagnets in the stator in shunt with the suspension permanent magnets. Optical sensors are distributed along the air gap between the stator and rotor to monitor any eccentricity occuring therebetween during rotation. In response to any eccentricity, the sensors supply an error signal to the electromagnets which produce a dynamic flux in the air gap to correct the eccentricity.

High storage efficiency is provided by the energy storage device since the filamentary wound, composite rotor has high specific strength per unit weight density, and all the mass is concentrated at maximum diameter. The storage device exhibits long life and nearly zero run-down losses because there is no mechanical contact with the flywheel rotor, and small losses caused by eddy currents and no mechanical drag.

The shape factor of the flywheel rotor is reduced somewhat by the presence of the magnetically soft iron layer which is required for both magnetic suspension and motor/generator operation. The effect of the iron, however, can be minimized by trading off "magnetic softness" with increased alloy content to improve the mechanical strength of the iron.

The above and still further objects, features, and advantages of the present invention will become apparent on consideration of the following detailed description of one specific embodiment thereof, especially when taken in conjunction with the accompanying drawing.

BRIEF DESCRIPTION OF THE DRAWING

FIG. 1 is a perspective view of a flywheel-type energy storage device in accordance with the present invention;

FIG. 4 is a cross-sectional view of a rotor and stator using the principles of the motor/generator and magnetic suspension shown respectively in FIGS. 2 and 3; and FIG. 5 is a top view of the rotor and stator showing a layout of the permanent magnets, electromagnets and iron poles.

DETAILED DESCRIPTION OF A SPECIFIC EMBODIMENT

Figure 3:
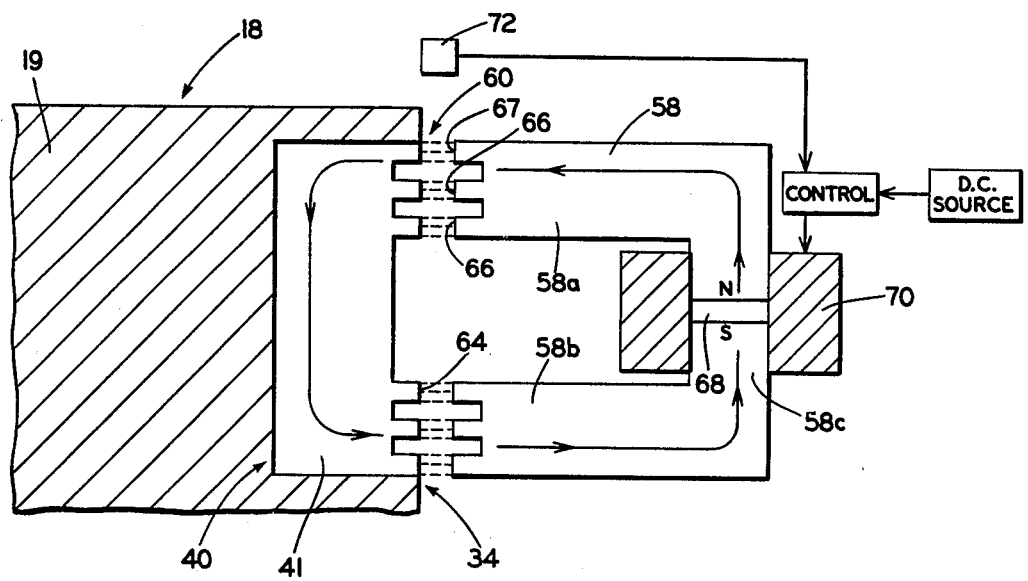
FIG. 3 is a diagram for explaining the operation of the magnetic bearing for levitating the flywheel rotor in the device of FIG. 1.

Referring to FIG. 1, an energy storage device 10, in accordance with the present invention, is shown located underground within a compartment 12 having a cover 14. Storage device 10 comprises a unique motor/generator device 16 that has, as its basic elements, a flywheel rotor 18 magnetically suspended around the outside of a ring-shaped stator 22, and an ironless armature 20 mounted to the stator. The stator 22 is supported on a base or platform 24 by legs 26. The motor/generator 16 is disposed within a module 28 comprising an annular shroud 30 and a shroud cover 32. Atmospheric pressure within module 28 is reduced to the $10^{-3}$ torr to $10^{-5}$ torr pressure range whereat windage losses are negligible. At that pressure range, however, the module 28 does not require vacuum seals. Generally, only a single pump-down cycle is required to achieve the pressure range stated.

As will become clear from the following discussion, motor/generator 16 is operated as a motor to accelerate flywheel rotor 18 toward its operating speed of rotation during low energy demand periods. Then, with flywheel rotor 18 slowing toward zero velocity during high energy demand periods, the motor generator 16 is operated as a generator. High energy conversion efficiency results due to unique flywheel construction in accordance with the invention, whereby eddy current and hysteresis losses as well as mechanical and magnetic drag are virtually eliminated.

The performance of any rotational kinetic energy storage system can be described by the following equations:

$$\frac{d(K.E.)}{dt} = -W(\omega) - \frac{P(\omega)}{\zeta(\omega)} \text{ Discharge Cycle} \quad (1)$$

$$\frac{d(K.E.)}{dt} = -W(\omega) + \frac{P(\omega)}{\zeta(\omega)} \quad \text{Charge Cycle} \quad (2)$$

where:

K.E. = stored kinetic energy in joules
t = time in seconds
$W(\omega)$ = losses, a function of $\omega$, in watts
$+P(\omega)$ = power input (charge), a function of $\omega$ in watts
$-P(\omega)$ = load output (discharge), a function of $\omega$ in watts
$\zeta(\omega)$ = efficiency of power conversion, a function of $\omega$
$\omega$ = angular rotational frequency in radians/seconds If the moment of inertia of the flywheel is constant, then (1) may be rewritten as follows:

$$\frac{d\omega}{dt} = \frac{-W(\omega)}{Jg} - \frac{P(\omega)}{Jg\zeta(\omega)} \quad (3)$$

where:

$\omega$ = angular rotation frequency in radians/seconds
$Jg$ = flywheel polar moment of inertia in joules·second$^2$ For the simple case where the load and losses are independent of $\omega$, the kinetic energy decreases linearly with time while $\omega$ decreases as the square root of time. For this case:

$$t^* = \frac{9.14 \times 10^{-5} Jg}{W_t} (N_i^2 - N_f^2) \quad (4)$$

where:

$t^*$ = time to slow to $N_f$ in minutes
$N_i$ = initial rotational speed in revolutions per minute
$N_f$ = final rotational speed in revolutions per minute
$Jg$ = flywheel polar mass moment of inertia in joule-s·second$^2$
$W_t$ = total load in watts Those variations of $W$, $P$, or $\zeta$ (as functions of $\omega$) which are not easily expressible mathematically would require numerical solution of equation (3). This procedure would be used to generate $\omega$ versus $t$ which could then be converted directly to K.E. versus $t$ (since $K.E. = \frac{1}{2} Jg \omega^2$) plots and the time for the system to drop to some percentages of the initial kinetic enery could be obtained directly from the plots.

The following equations govern the energy density for any given flywheel configuration:

$$E_w = K_s \frac{\delta}{\gamma} \quad (5)$$

$$W/V_s = E_{vs}/E_w \quad (6)$$

where:

$E_w$ = energy density-storage kinetic energy per unit of flywheel weight
$E_{vs}$ = stored kinetic energy per unit of swept flywheel volume
$W/V_s$ = flywheel weight per unit of flywheel swept volume
$K_s$ = constant for comparing effectiveness of various flywheel shapes (maximum effectiveness = 1.0)
$\sigma/\gamma$ = flywheel specific strength, maximum working stress in flywheel per unit of weight density Based on equations (4) and (5) and on structural considerations, a flywheel storage system requires an "effective" ($K_s$) rotor shape and moment of inertia, in addition to maximum strength, low parasitic losses and high power conversion efficiency. Other considerations include reliable operation over a long life, and ability to avoid self-destruction in the event of seismic disturbances.

A flywheel rotor satisfying the above criteria is a ring formed of filamentary, composite (anisotropic) material, such as Kevlar-49, having an inner diameter ratio to outer diameter ratio of at least 0.9. That configuration of rotor 18, having a uniaxially stressed geometry, provides extremely high density as well as high shape factor. Rotor 18 will not delaminate so long as maximum transverse stress is maintained below 0.5% of the maximum fiber stress. This condition is satisfied so long as the inner diameter to outer diameter ratio of rotor 18 is greater than or equal to 0.9.

Figure 2:
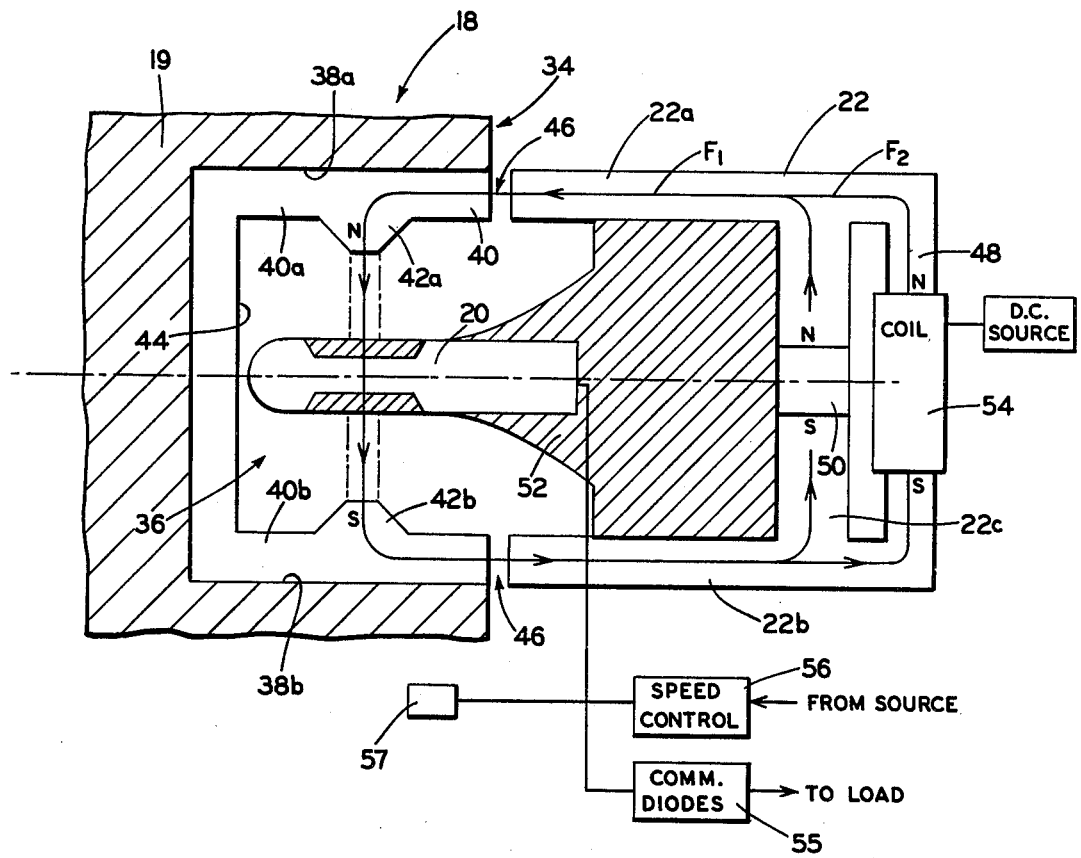
FIG. 2 is a diagram for illustrating the operation of the motor/generator system.

Motor/generator 16 incorporates two magnetic circuits to perform, respectively, the motor/generator function and rotor suspension. Referring to FIG. 2, rotor 18 includes a ring portion 19 formed of the composite material, and the inner rim 34 of rotor 18 contains a circumferential slot 36 having wall portions 38a, 38b and 44 onto which is located a layer of magnetically soft iron 40. Upper layer 40a and lower layer 40b, shown in cross-section, are disposed around the entire inner rim 34 and are shaped to present the salient pole pair shown. The upper pole 40a, designated "N" has a salient pole portion 42a midway between inner rim 44 of slot 36 and outer rim 34. Similarly, lower pole 40b contains a salient portion 42b designated by the letter "S". These poles 42a and 42b are maintained in vertical alignment to each other, as shown, but are spaced apart from adjacent pole pairs along the circumferential slot 36 (see also FIG. 5).

Some deterioration in the shape factor of the flywheel rotor 18 occurs due to the presence of magnetically soft iron layer 40. Magnetically soft iron is required for the purpose of the magnetic suspension and motor/generator requirements. However, the reduction in shape factor may be minimized by trading off some magnetic softness of iron layer 40 for an increase in mechanical strength, or through an interference fit between the iron and composite ring. As another possibility, iron materials exhibiting both magnetic softness and mechanical strength, such as METGLASS, may be used as layer 40.

Still referring to FIG. 2, ring-shaped stator 22 (only the motor/generator circuit portion in the stator is shown) is spaced apart from the rim 34 of rotor 18 to form an air gap 46. The motor/generator magnetic circuit portion of stator 22 shown is approximately U-shaped and includes legs 22a and 22b, and connecting leg 22c. A shunt 48 is formed in parallel to connecting leg 22c.

A permanent magnet 50 is disposed in connecting leg 22c of stator 22, and is preferably a high flux density magnet. Permanent magnet 50, shown in cross-section in FIG. 2, is a continuous ring that extends completely around the stator 22. Where a permanent magnet having high coercive force but relatively low flux density, such as Samarium Cobalt, is used, that magnet (not shown) may be oriented obliquely to connecting leg 22c for increased flux density.

Ironless armature 20 (see also FIG. 1) is seated within stator 22 in a bed of epoxy 52. The armature 20 is also in the form of a continuous ring, as shown in FIG. 2, and extends completely around the stator 22. Armature 20 also extends into circumferential slot 36 formed in rotor 18. The armature 20 is spaced apart from rim 44 for proper clearance and is midway between poles 42a and 42b of iron layer 40. Armature 20 itself contains a separate winding (not shown) for each electrical phase of motor/generator 16. For example, in a three-phase system, three windings spaced apart by 120 electrical degrees are provided. The discrete windings are formed on a mandrel of iron-conducting material. The use of an ironless armature in combination with magnetically soft poles on rotor 18 is particularly important to the present invention to the extent that there are no hysteresis losses caused by alternately magnetizing and demagnetizing ferrous material in the armature by magnetic poles on rotor 18, and no static forces caused by any magnetic attraction and repulsion forces between the poles 42a and 42b and armature 20.

Permanent magnet 50, disposed in connecting leg 22c of the stator 22, generates a magnetic flux $F_1$ (see arrow) that follows a path from the North pole of the magnet through leg 22a of stator 22, and then through upper air gap 46, pole 42a, circumferential slot 36, including armature 20, pole 42b, lower air gap 46, leg 22b, and to the South pole of the magnet.

During rotation of the rotor 18, North and South pole pairs 42a and 42b of iron layer 40 pass along the continuous armature 20 so that the moving field flux on the rotor cuts across the windings of the armature. There is no polarity reversal between corresponding pairs of North poles 42a and South poles 42b. Stated another way, all the poles 42a located on upper iron layer 40a are designated as North and all the poles on layer 40b are designated South, only to indicate that magnetic flux passes unidirectionally from poles 42a to 42b. Current return in armature 20 occurs in regions of reduced magnetic flux, and not in regions of flux reversal. Motor/generator 16 is thus termed "homopolar" referring to the unidirectional nature of the flux in the circumferential slot 36 of rotor 18.

When motor/generator 16 is operated as a generator, the moving magnetic flux field between poles 42a and 42b induces an electromotive force in the armature windings. Conventional commutation diodes 55, shown symbolically in FIG. 2, are connected to the proper phases of the armature 20. The magnitude of voltage induced in armature 20 is controlled by an electromagnet coil 54 wound around shunt 48 of stator 22. D.C. current is supplied to coil 54 to produce a flux $F_2$ that selectively aids or reduces flux $F_1$ produced by permanent magnet 50. For example, when coil 54 is energized so as to produce a flux flowing in the direction shown by the arrows, the flux $F_2$ tends to aid the flux $F_1$ produced by permanent magnet 50 thereby increasing the amount of voltage induced in armature 20. On the other hand, when coil 54 is energized so as to produce a flux $F_2$ opposite the direction of the arrows, the flux $F_2$ tends to cancel out or "buck" flux $F_1$ generated by permanent magnet 50. The result is reduced voltage in armature coil 20.

With motor/generator 16 operating as a motor, alternating current is supplied to the phase windings of armature 20 using electronic commutation of a known type shown, for example, in U.S. Pat. No. 3,569,804 to Studer, assigned to the assignee of the present invention, and incorporated herein by reference. Such a commutation control is also shown in NASA Tech Brief B75-10247 published October 1975. Commutation control 56 is shown schematically in FIG. 2 and is not discussed herein in detail for the sake of brevity. Basically, however, control 56 comprises a set of sensors, such as optical sensor 57, for sensing the rotational orientation of the rotor 18 with respect to the stator. In response to the output of the detectors, electronic commutation control 56 energizes the phase windings of armature 20 in proper sequence and proper frequency. The commutation frequency increases exactly in step with the rotor velocity.

Referring now to FIG. 3, bearing member 58 of stator 22 is spaced apart from rotor 18 forming an air gap 60 corresponding to air gap 46 in FIG. 2. The inner rim 34 of rotor 18 at bearing portion 41 contains a set of teeth 64 on iron layer 40 exposed to air gap 60. The iron layer 40 in FIG. 3 is integral with layer 40 in FIG. 2, as is apparent from the composite stator shown in FIG. 4, discussed below.

On the outer rim 67 of bearing 58, a set of teeth 66 is also exposed to air gap 60. The sets of teeth 64 and 66 are identical in configuration. When the stator 22 and rotor 18 are in proper axial position with respect to each other, there is a path of minimum reluctance between each of the salient teeth respectively on rim 34 of rotor 18 and bearing 58, as shown in FIG. 3.

A plurality of permanent magnets 68 are embedded in center portion 58c of bearing 58 (see also FIG. 5). The permanent magnets 68 produce a steady state bias flux that passes through legs 58a and 58b of bearing 58, through air gaps 60 and iron layer 40 on rotor 18, as shown by the arrows. The steady state flux tends to maintain bearing 58 at a height whereby the magnetic reluctance in the air gap 60 is at a minimum, i.e., with the teeth 68 in horizontal alignment with teeth 64 on rotor 18. Axial alignment of the rotor 18 is passive and requires no external source of power.

There is a tendency for the rotor and stator to become eccentric, i.e., the size of the air gap changes along the circumference of the motor - stator interface. In order to provide dynamic adjustment of the radial position of the rotor 18 for maintaining the rotor 18 and stator 22 perfectly concentric to each other, a plurality of electromagnetic coils 70 (see also FIG. 5) are provided around rectangular magnets 68 in portion 58c of bearing 58. Electromagnets 70 are energized as required to produce a magnetic flux in aiding or cancelling relationship to the flux produced by permanent magnets 68 so as to compensate for eccentricities of the rotor 18 during rotation. The plurality of electromagnets 70 are equispaced from each other around stator 22 (FIG. 5) and are energized with bipolar current as a function of the output of a plurality of position sensors 72 located in view of air gap 60. In practice, at least three coils 70 and sensors 72 are required to maintain rotor 18 and stator 22 concentric to each other. Details of position sensors 72 and electromagnetic coils 70 for the purpose described herein are disclosed in U.S. Pat. No. 3,865,442 to Studer assigned to the common assignee, incorporated herein by reference. It can thus be appreciated that permanent magnet 68 produces a primary source of magnetic flux for maintaining bearing 58 in axial alignment to iron layer 40 of rotor 18, and that electromagnet 70 produces a secondary source of flux serving only to correct the radial position of the rotor for eccentricities. Current from an external control source must be supplied to electromagnet 70 but the amount of steady state current required is minimal. Since electromagnet 70 is continuously energized with current varying as a function of the output of sensors 72, the center of rotation of rotor 18 does not deviate substantially from the center of stator 22.

Referring now to FIG. 4, stator 22 (including the motor/generator as well as suspension magnetic circuit) and rotor 18, are shown in cross-section to show the location of the permanent magnets and electromagnets associated with the motor/generator and suspension systems described above with respect to FIGS. 2 and 3. Rotor 18 comprises filamentary, composite ring 19 onto which is disposed the magnetically soft iron layer 40. Circumferential slot 36 is formed in iron layer 40 and extends somewhat into composite ring 19 to inner rim 44. The iron layer 40 contains magnetic bearing portions 41 on opposite sides of slot 36, and also contains the poles 42a and 42b. The bearing portions 41 are substantially C-shaped and include teeth 64 exposed to air gap 60. Upper and lower sets of teeth 64 are separated by divider portion 72.

Stator 22 includes the permanent magnet 50 for producing motor/generator flux. Armature 20 is mounted against magnet 50 in epoxy 52. Electromagnet 54 is mounted on magnetic shunt 48. Magnet 50 produces primary flux passing through air gaps 46, circumferential slot 36, and armature 20, as shown by the dotted line arrows. Electromagnet 54 generates secondary flux passing through air gaps 60 as well as through circumferential slot 36 and armature 20, as also shown by dotted line arrows. The flux produced by electromagnet 50 is superimposed upon the flux produced by permanent magnet 50 and serves to control the amount of total flux cutting armature 20.

Permanent magnets 68 are disposed within coils 70 in stator 22 on opposite sides of armature 20. The permanent magnets 68 produce primary flux that passes through air gaps 60 and 46, as shown by the solid line arrows. Electromagnet coils 70 produce a secondary flux superimposed upon the flux produced by magnets 68 to compensate for any eccentricities in rotor 18 during rotation, as discussed above. Axial alignment of rotor 18 is enhanced by the fact that teeth are provided on the facing rims of rotor 18 and stator 22 in bearing region 58a as well as in bearing region 58b on opposite sides of armature 20. Clearance for epoxy fillet 52 is ensured by providing a recess 74 at the circumferential slot 36, as shown in FIG. 4.

Referring now to FIG. 5, the layout of the elements described above with respect to rotor 18 and stator 22 is shown. Rectangular suspension permanent magnet 68 is located adjacent air gap 60, and is surrounded by electromagnetic coil 70. It is to be understood that at least three such magnets 68 are distributed around stator 22. Field coils 54 are distributed along the entire circumference of stator 22 and are equispaced from each other in seats 76 of shunt 48. A single permanent magnet 50, for producing flux through armature 20 (FIG. 4) is located between permanent magnet 68 and extends continuously around stator 22.

On rotor 18, poles 42a and 42b are distributed facing air gap 46. Armature 20 extends beyond poles 42a and 42b toward rotor portion 44 (FIG. 2), but there is sufficient clearance from the end of the armature and portion 44 to prevent any interference during rotation of the rotor 18.

In summary, there has been described a high efficiency, flywheel-type, energy storage device 10 comprising a flywheel rotor 18 formed of filamentary, composite material that is magnetically suspended around an inner, ring-shaped stator 22. An ironless armature 20, attached to the stator 22, extends into a circumferential slot 36 formed in the inner rim of rotor 18. Alternating current is electronically commutated to the armature 20 when the motor/generator 16 is operated as a motor. On the other hand, when motor/generator 16 is operated as a generator, current is drawn from the armature 20 using commutation diodes 55. Due to the homopolar rotor configuration of motor/generator 16, energy conversion efficiency is higher than that heretofore provided because there are no appreciable eddy current losses or hysteresis resulting from any moving magnetic fields interacting with stationary metallic members, as in the prior art. Furthermore, the provision of magnetic suspension and electronic commutation eliminates any physical drag on the rotor.

While there has been described and illustrated one specific embodiment of the invention, it will be clear that variations in the details of the embodiment specifically illustrated and described, may be made without departing from the true spirit and scope of the invention as defined in the appended claims. For example, it is apparent that suspension coil 72 and field coils 54 could, as desired, be combined as single coils.

What is claimed is:

1. An energy storage apparatus comprising:

a stator;

a flywheel rotor including a spokeless, continuous ring portion, and a plurality of salient pole members distributed along an inner rim of said ring portion, a first air gap being formed between opposed pairs of said pole members;

said flywheel rotor being rotatable around an outer rim of said stator, a second air gap being formed between said stator and said rotor;

stationary armature means extending into said first air gap;

means for supplying alternating current to said armature means in a motor mode of operation, said alternating current interacting with magnetic flux in said first air gap to cause rotation of said rotor;

means for withdrawing alternating current from said armature means in a generator mode of operation; and magnetic bearing means for magnetically supporting said rotor in axial and radial alignment to said stator, including;

first permanent magnet means incorporated in said stator for establishing a steady state flux in said second air gap, and sets of opposed salient teeth within said rotor and said stator, respectively, said steady state flux passing through said second air gap between said opposed salient teeth for maintaining said rotor and said stator in axial alignment to one another.

2. The apparatus of claim 1, wherein said armature means is mounted to said stator.

3. The apparatus of claim 1, wherein said stator comprises a continuous ring member.

4. The apparatus of claim 1, wherein said rotor ring portion is formed of a filamentary wound, composite material, and said poles are formed of iron.

5. The apparatus of claim 1, wherein said bearing means further includes first electromagnet means incorporated in said stator for establishing a dynamic flux in said second air gap, said dynamic flux tending to maintain said rotor and stator in radial alignment to each other by reducing any eccentricity of said rotor with respect to said stator.

6. The apparatus of claim 5, including means for monitoring a size of said second air gap and means responsive to said monitoring means for energizing said first electromagnet means to compensate for any eccentricity of said second air gap.

7. The apparatus of claim 5, wherein said first electromagnet means is continuously controlled.

8. The apparatus of claim 1, wherein an inner rim of said rotor contains a circumferential slot defining said first air gap, pairs of said pole members being radially aligned in facing relationship to each other within said slot.

9. The apparatus of claim 8, wherein said pole members are formed of magnetically soft iron, thereby providing unidirectional flux between said opposed ones of said pole members.

10. The apparatus of claim 8, wherein said stator includes second permanent magnet means for establishing a steady state flux through said first air gap and said armature, and further includes second electromagnet means in shunt with said second permanent magnet means for establishing a control flux through said armature.

11. The apparatus of claim 1, wherein said first permanent magnet means includes a plurality of permanent magnets equispaced from each other along said stator.

12. The apparatus of claim 10, wherein said second permanent magnet means includes a single ring-shaped permanent magnet disposed along and concentric to said ring-shaped stator.

13. The apparatus of claim 5, wherein said first electromagnet means is wound around said first permanent magnet means.

14. The apparatus of claim 1, wherein said rotor and said stator are located within an air evacuated, enclosed module.

* * * * *